US010356227B2

(12) United States Patent
Tian et al.

(10) Patent No.: US 10,356,227 B2
(45) Date of Patent: Jul. 16, 2019

(54) METHOD OF PACKET MARKING FOR FLOW ANALYTICS

(71) Applicant: Telefonaktiebolaget L M Ericsson (publ), Stockholm (SE)

(72) Inventors: Albert Jining Tian, Cupertino, CA (US); Ramanathan Lakshmikanthan, Santa Clara, CA (US); Evgeny Tantsura, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 331 days.

(21) Appl. No.: 14/674,429

(22) Filed: Mar. 31, 2015

(65) Prior Publication Data
US 2016/0294987 A1 Oct. 6, 2016

(51) Int. Cl.
H04L 29/06 (2006.01)
H04L 12/24 (2006.01)
H04L 12/26 (2006.01)

(52) U.S. Cl.
CPC .............. *H04L 69/22* (2013.01); *H04L 41/04* (2013.01); *H04L 43/022* (2013.01); *H04L 41/5096* (2013.01); *H04L 43/087* (2013.01); *H04L 43/0852* (2013.01); *H04L 43/0876* (2013.01)

(58) Field of Classification Search
CPC ... H04L 41/04; H04L 41/5096; H04L 43/022; H04L 43/0852; H04L 45/38; H04L 45/50; H04L 69/22; H04L 43/087; H04L 43/0876; G06F 9/4445
See application file for complete search history.

(56) References Cited

U.S. PATENT DOCUMENTS

| 7,463,639 | B1 * | 12/2008 | Rekhter | .............. H04L 12/4641 370/409 |
| 9,178,810 | B1 * | 11/2015 | Singh | ....................... H04L 45/50 |
| 9,246,801 | B1 * | 1/2016 | Kompella | ............... H04L 45/50 |
| 9,686,156 | B2 * | 6/2017 | Wang | .................... H04L 43/026 |
| 2009/0252058 | A1 * | 10/2009 | Chen | ...................... H04L 45/00 370/254 |

(Continued)

OTHER PUBLICATIONS

Cociglio, et al., "A Method for IP Multicast Performance Monitoring; draft-cociglio-mboned-multicast-pm-01.txt," Internet-Draft, IETF Trust, Oct. 22, 2010, 23 pages.

(Continued)

*Primary Examiner* — Charles C Jiang
*Assistant Examiner* — Ryan C Kavleski
(74) *Attorney, Agent, or Firm* — NDWE, LLP

(57) ABSTRACT

A method is implemented by a node of a network domain having a plurality of nodes, where the node functions as an ingress node of the network domain for a data flow. The method enables data flow analysis across the network domain. The method includes receiving a data packet belonging to a data flow at an ingress node of the network domain, determining whether the data packet is to be marked for the data flow analysis, determining whether an egress node of the network domain for the data flow supports data packet marking, marking the data packet with a marking label indicating to supporting nodes in the network domain that the data packet is to be processed for data flow analysis, and forwarding the data packet toward the egress node of the network domain.

20 Claims, 10 Drawing Sheets

(56) References Cited

U.S. PATENT DOCUMENTS

| | | | | |
|---|---|---|---|---|
| 2010/0165929 | A1* | 7/2010 | Berzin | H04L 29/12283 370/329 |
| 2011/0110220 | A1* | 5/2011 | Breslin | H04L 43/04 370/216 |
| 2013/0259056 | A1* | 10/2013 | Kotrabasappa | H04L 45/24 370/401 |
| 2013/0322248 | A1* | 12/2013 | Guo | H04L 45/507 370/235 |
| 2013/0332602 | A1 | 12/2013 | Nakil et al. | |
| 2015/0109907 | A1* | 4/2015 | Akiya | H04L 47/125 370/229 |
| 2015/0249587 | A1* | 9/2015 | Kozat | H04L 43/10 370/222 |
| 2016/0254994 | A1* | 9/2016 | Bryant | H04L 43/0829 370/392 |

OTHER PUBLICATIONS

RFC: 768: Postel, "User Datagram Protocol," Aug. 28, 1980, 3 pages, Network Working Group, Request for Comments: 768.

RFC 791: "Internet Protocol," IPv4, Darpa Internet Program, Protocol Specification, Sep. 1981, 50 pages.

RFC 793: "Transmission Control Protocol, DARPA Internet Program Protocol Specification," Sep. 1981, 91 pages, Network Working Group, Request for Comments: 793.

RFC 1058: Hedrick, "Routing Information Protocol," Jun. 1988, 33 pages, Network Working Group, Request for Comments: 1058.

RFC 1142: Oran, "OSI IS-IS Intra-domain Routing Protocol," Feb. 1990, 157 pages, Network Working Group, Request for Comments: 1142.

RFC 1180: Socolofsky, et al., "A TCP/IP Tutorial," Jan. 1991, 28 pages, Network Working Group, Request for Comments: 1180.

RFC 2080: Malkin, et al., "RIPng for IPv6," Jan. 1997, 19 pages, Network Working Group, Request for Comments: 2080.

RFC 2205: Braden, et al., "Resource ReSerVation Protocol (RSVP)—Version 1 Functional Specification," Sep. 1997, 112 pages, Network Working Group, Request for Comments: 2205.

RFC 2210: Wroclawski, "The Use of RSVP with IETF Integrated Services," Sep. 1997, 33 pages, Network Working Group, Request for Comments: 2210.

RFC 2211: Wroclawski, "Specification of the Controlled-Load Network Element Service," Sep. 1997, 19 pages, Network Working Group, Request for Comments: 2211.

RFC 2212: Shenker, et al., "Specification of Guaranteed Quality of Service," Sep. 1997, 20 pages, Network Working Group, Request for Comments: 2212.

RFC 2328: Moy, "OSPF Version 2," Apr. 1998, 244 pages, Network Working Group, Request for Comments: 2328, The Internet Society.

RFC 2453: Malkin, "RIP Version 2," Nov. 1998, 39 pages, Network Working Group, Request for Comments: 2453, The Internet Society.

RFC 2460: Deering, et al., "Internet Protocol, Version 6 (IPv6) Specification," Dec. 1998, 39 pages, Network Working Group, Request for Comments: 2460, The Internet Society.

RFC 2474: Nichols, et al., "Definition of the Differentiated Services Field (DS Field) in the IPv4 and IPv6 Headers," Dec. 1998, 20 pages, Network Working Group, Request for Comments: 2474, The Internet Society.

RFC 2475: Blake, et al., "An Architecture for Differentiated Services," Dec. 1998, 36 pages, Network Working Group, Request for Comments: 2475, The Internet Society.

RFC 2597: Heinanen, et al., "Assured Forwarding PHB Group," Jun. 1999, 11 pages, Network Working Group, Request for Comments: 2597, The Internet Society.

RFC 2675: Borman, et al., "IPv6 Jumbograms," Aug. 1999, 9 pages, Network Working Group, Request for Comments: 2675, The Internet Society.

RFC 2983: Black, "Differentiated Services and Tunnels," Oct. 2000, 14 pages, Network Working Group, Request for Comments: 2983, The Internet Society.

RFC 3086: Nichols, et al., "Definition of Differentiated Services Per Domain Behaviors and Rules for their Specification," Apr. 2001, 24 pages, Network Working Group, Request for Comments: 3086, The Internet Society.

RFC 3140: Black, et al., "Per Hop Behavior Identification Codes," Jun. 2001, 8 pages, Network Working Group, Request for Comments: 3140, The Internet Society.

RFC 3209: Awduche, et al., "RSVP-TE: Extensions to RSVP for LSP Tunnels," Dec. 2001, 61 Pages, Network Working Group, Request for Comments: 3209, The Internet Society.

RFC 3246: Davie, et al., "An Expedited Forwarding PHB (Per-Hop Behavior)," Mar. 2002, 16 pages, Network Working Group, Request for Comments: 3246, The Internet Society.

RFC 3247: Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

RFC 3260: Grossman, "New Terminology and Clarifications for Diffserv," Apr. 2002, 10 pages, Network Working Group, Request for Comments: 3260, The Internet Society.

RFC 3289: Baker, et al., "Management Information Base for the Differentiated Services Architecture," May 2002, 116 pages, Network Working Group, Request for Comments: 3289, The Internet Society.

RFC 3290: Bernet, et al., "An Informal Management Model for Diffserv Routers," May 2002, 56 pages, Network Working Group, Request for Comments: 3290, The Internet Society.

RFC 3317: Chan, et al., "Differentiated Services Quality of Service Policy Information Base," Mar. 2003, 96 pages, Network Working Group, Request for Comments: 3317, The Internet Society.

RFC 3473: Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

RFC 3936: Kompella, et al., "Procedures for Modifying the Resource reSerVation Protocol (RSVP)," Oct. 2004, 7 pages, Network Working Group, Request for Comments: 3936, The Internet Society.

RFC 4113: Fenner, et al., "Management Information Base for the User Datagram Protocol (UDP)," Jun. 2005, 19 pages, Network Working Group, Request for Comments: 4113, The Internet Society.

RFC 4271: Rekhter, et al., "A Border Gateway Protocol 4 (BGP-4)," Jan. 2006, 104 pages, Network Working Group, Request for Comments: 4271, The Internet Society.

RFC 4301: Kent, et al., "Security Architecture for the Internet Protocol," Dec. 2005, 101 pages, Network Working Group, Request for Comments: 4301, The Internet Society.

RFC 4309: Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

RFC 4364: Rosen, et al., "BGP/MPLS IP Virtual Private Networks (VPNs)," Feb. 2006, 47 pages, Network Working Group, Request for Comments: 4364, The Internet Society.

RFC 4495: Polk, et al., "A Resource Reservation Protocol (RSVP) Extension for the Reduction of Bandwidth of a Reservation Flow," May 2006, 21 pages, Network Working Group, Request for Comments: 4495, The Internet Society.

RFC 4558: Ali, et al., "Node-ID Based Resource Reservation Protocol (RSVP) Hello: A Clarification Statement," Jun. 2006, 7 pages, Network Working Group, Request for Comments: 4558, The Internet Society.

RFC 4594: Babiarz, et al., "Configuration Guidelines for DiffServ Service Classes," Aug. 2006, 57 pages, Network Working Group, Request for Comments: 4594, The Internet Society.

RFC 5036: Andersson, et al., "LDP Specification," Oct. 2007, 135 pages, Network Working Group, Request for Comments: 5036, The IETF Trust.

RFC 5340: Coltun, et al., "OSPF for IPv6," Jul. 2008, 94 pages, Network Working Group, Request for Comments: 5340, The IETF Trust.

RFC 5405: Eggert, et al., "Unicast UDP Usage Guidelines for Application Designers," Nov. 2008, 27 pages, Network Working

(56) References Cited

OTHER PUBLICATIONS

Group, Request for Comments: 5405, IETF Trust and the persons identified as the document authors.

RFC 5865: Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

RFC 6790: Kompella, et al., "The Use of Entropy Labels in MPLS Forwarding," Nov. 2012, 25 pages, Internet Engineering Task Force (IETF), Request for Comments: 6790, IETF Trust and the persons identified as the document authors.

\* cited by examiner

A MPLS packet with Marking Label Indicator may look like the following:

| Transport Label | Application Label | Marking Lable Indicator 1 | Payload |
|---|---|---|---|

FIG. 5A

A MPLS packet with Flow Marking Label may look like the following:

| Transport Label | Application Label | Flow Marking Label | Payload |
|---|---|---|---|

FIG. 5B

The Flow Label should be sufficient to be used for load balancing purposes, i.e., to serve as Entropy Label as defined in RFC6790.

| Transport Label | Application Label | Marking Lable Indicator 1 | Flow Marking Label | Payload |
|---|---|---|---|---|

FIG. 5C

| Option Type (1) | Option Data Len (1) | Flow Marking Label (3 octet) | Reserved |
|---|---|---|---|

FIG. 5D

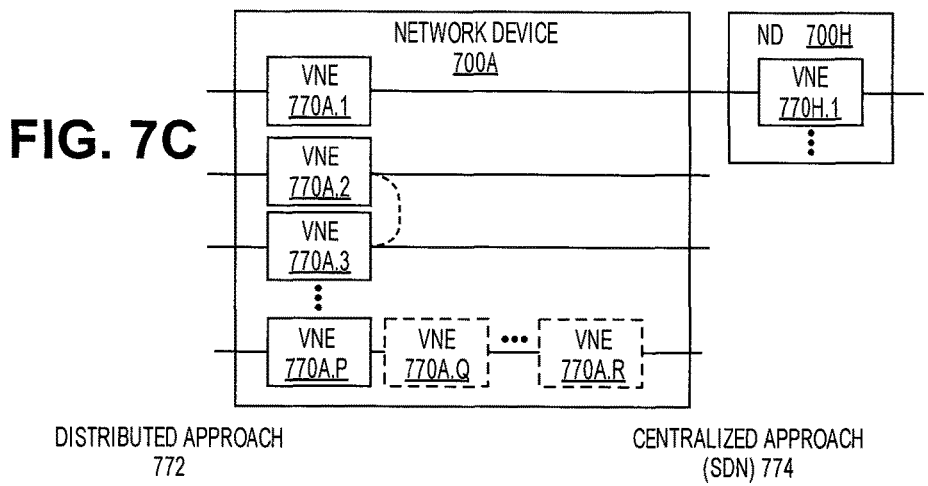
FIG. 7C
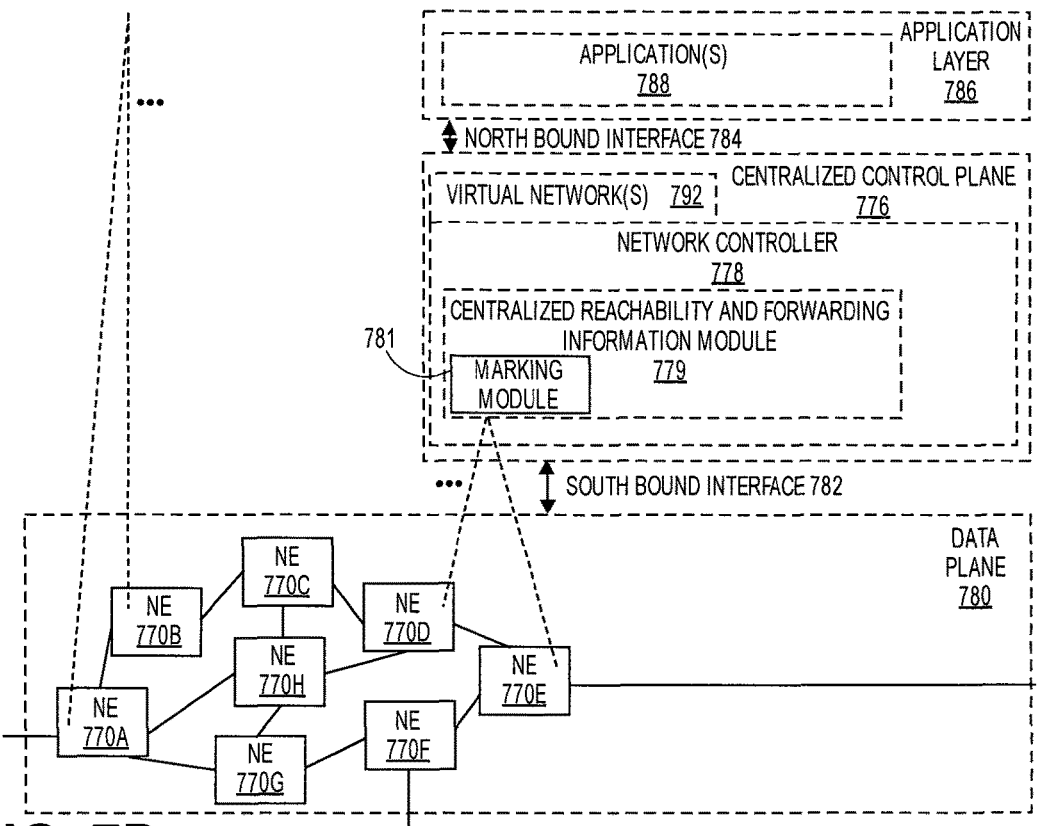
FIG. 7D
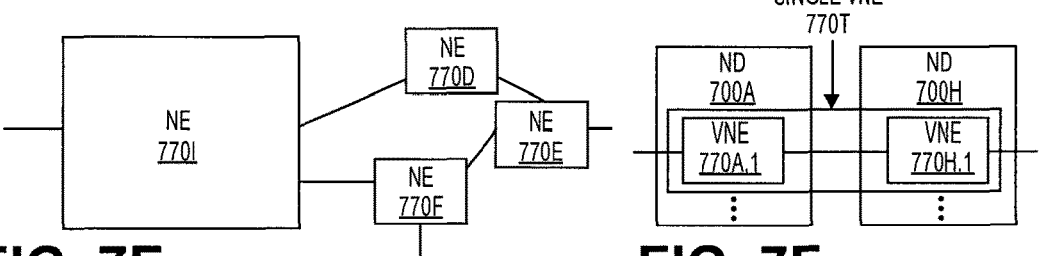
FIG. 7E
FIG. 7F

METHOD OF PACKET MARKING FOR FLOW ANALYTICS

FIELD

Embodiments of the invention relate to providing network analytics in a network domain. Specifically, the embodiments relate to a method and system implemented by nodes in the network domain to enable network analytics that can correlate data packets of a data flow across the domain.

BACKGROUND

In order to understand the overall behavior of data traffic in a network domain, it is important to understand the characteristics of the individual data traffic flows in the network. The characteristics of the individual data traffic flows can include information about the individual data packets or metrics related to the set of packets in each data flow. These metrics can include measurements such as average data packet size, types of encapsulation of data packets, delay between sending and receiving data packets across the network domain, variations in throughput for data flows across the network (i.e., jitter), bandwidth utilization for a data flow, identification of a path for each data flow and similar metrics and data related to the each data flow. Once this sort of network analytic data has been collected for a data flow it can be analyzed in conjunction with similar data collected for the other data flows traversing the network to build an image or model of the behavior of data traffic across the network as a whole.

Collecting network analytic data is performed at a subset of nodes within the network domain. These nodes can be selected or placed within the network to provide a coherent picture of the data traffic in the network domain. For example, the nodes that collect the network analytic data can be ingress or egress nodes in the network domain at the edge of network domain enabling end to analysis of data flows. Nodes in the interior can also be utilized to identify internal bottlenecks and similar issues within the network domain. However, collecting and reporting network analytic data can consume significant resources at the node that is performing the collection.

The addition of this task to a node can have a negative effect on its performance. Thus, it is important that the collection of network analytic data at each participating node be as efficient as possible. Many solutions for collecting network analytic data are inefficient and unworkable. A naïve implementation would be to examine each data packet that traverses a node in the network. However, this would be to computationally intensive and would severely impact the performance of the node. In many cases, sampling is performed at a node to select a representative subset of the data traffic of the data flow to utilize for network analytics. However, the use of sampling prevents the tracking of the same data packet across the network domain. This limits the types of analysis that can be performed, because the information about data packets will vary from node to node and analysis based on end to end tracking of individual data packets cannot be performed.

SUMMARY

A method is implemented by a node of a network domain having a plurality of nodes, where the node functions as an ingress node of the network domain for a data flow. The method enables data flow analysis across the network domain. The method includes receiving a data packet belonging to a data flow at an ingress node of the network domain, determining whether the data packet is to be marked for the data flow analysis, determining whether an egress node of the network domain for the data flow supports data packet marking, marking the data packet with a marking label indicating to supporting nodes in the network domain that the data packet is to be processed for data flow analysis, and forwarding the data packet toward the egress node of the network domain.

A network device functions as a node of a network domain having a plurality of nodes, where the node functions as an ingress node of the network domain for a data flow. The method enables data flow analysis across the network domain. The network device includes a non-transitory computer-readable medium having stored therein a marking module. The network device also includes a processor that is coupled to the non-transitory computer-readable medium. The processor is configured to execute the marking module. The marking module is configured to receive a data packet belonging to a data flow at an ingress node of the network domain, to determine whether the data packet is to be marked for the data flow analysis, to determine whether an egress node of the network domain for the data flow supports data packet marking, to mark the data packet with a marking label indicating to supporting nodes in the network domain that the data packet is to be processed for data flow analysis, and to forward the data packet toward the egress node of the network domain.

A computing device functions as a node of a network domain having a plurality of nodes, where the node functions as an ingress node of the network domain for a data flow. The computing device executes a plurality of virtual machines for implementing network function virtualization (NFV), where a virtual machine from the plurality of virtual machines is configured to implement a method to enable data flow analysis across the network domain. The computing device includes a non-transitory computer-readable medium having stored therein a marking module. The computing device also includes a processor coupled to the non-transitory computer-readable medium. The processor is configured to execute the virtual machine, where the virtual machine is configured to execute the marking module. The marking module is configured to receive a data packet belonging to a data flow at an ingress node of the network domain, to determine whether the data packet is to be marked for the data flow analysis, to determine whether an egress node of the network domain for the data flow supports data packet marking, to mark the data packet with a marking label indicating to supporting nodes in the network domain that the data packet is to be processed for data flow analysis, and to forward the data packet toward the egress node of the network domain.

A control plane device implements a control plane of a software defined networking (SDN) network including a plurality of network devices implementing the data plane of the SDN network, where the control plane device is configured to execute a method to enable data flow analysis across the network domain. The control plane device includes a non-transitory computer-readable medium having stored therein a marking module. The control plane device also includes a processor coupled to the non-transitory computer-readable medium. The processor is configured to execute the marking module. The marking module is configured to receive a data packet belonging to a data flow at an ingress node of the network domain, to determine whether the data packet is to be marked for the data flow analysis, to determine whether an egress node of the network domain for the data flow supports data packet marking, to mark the data packet with a marking label indicating to supporting nodes in the network domain that the data packet is to be processed for data flow analysis, and to forward the data packet toward the egress node of the network domain.

BRIEF DESCRIPTION OF THE DRAWINGS

The invention may best be understood by referring to the following description and accompanying drawings that are used to illustrate embodiments of the invention. In the drawings:

FIGS. 5A-D are diagrams of various embodiments of a marking label.

FIG. 7C illustrates various exemplary ways in which virtual network elements (VNEs) may be coupled according to some embodiments of the invention.

FIG. 7D illustrates a network with a single network element (NE) on each of the NDs of FIG. 7A.

FIG. 7E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.

FIG. 7F illustrates a case where multiple VNEs are implemented on different NDs and are coupled to each other, and where the centralized control plane has abstracted these multiple VNEs such that they appear as a single VNE within one of the virtual networks of FIG. 7A, according to some embodiments of the invention.

DETAILED DESCRIPTION

Figure 1:
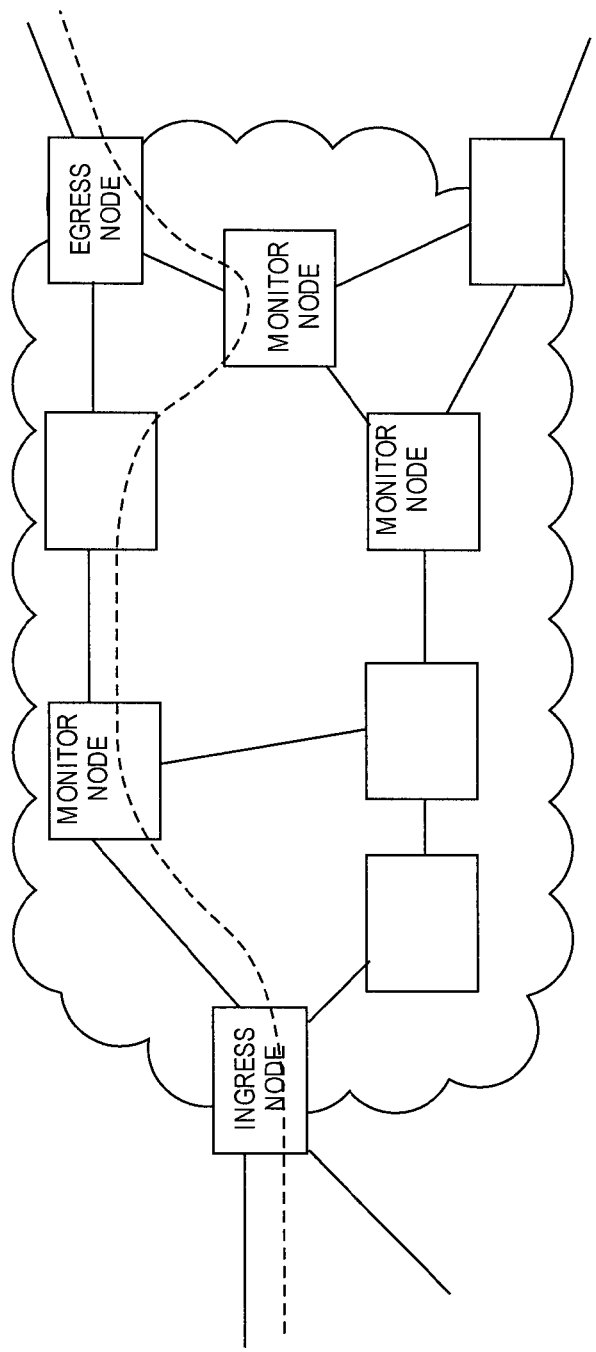
FIG. 1 is a diagram of one embodiment of a network domain traversed by a data flow.

The following description describes methods and apparatus for implementing a system for enabling data analysis in a network domain. The method and system is implemented at an ingress node, intermediate supporting nodes and an egress node. The ingress node inserts a marking label into data packets of a particular data flow received at the ingress node. The intermediate supporting nodes report back to the ingress node or a similar analysis node when the marked data packets are received. When the data packets reach an egress node for the data flow in the network domain, the egress node reports to the ingress node or analysis node then removes the marking label from the data packet before it is forwarded out of the network domain. The nodes in a network domain can signal between themselves to determine which nodes in a network domain support the marking and data analysis process and system such that the ingress nodes for data flows mark data packets destined for egress nodes that support the method and system.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

Network analytics requires the collection of data for each data flow to determine its impact on the overall network traffic as well as how the each data flow itself is performing. However, examining each data packet in a data flow at each node in a network can be expensive, both in terms computational processing power on the nodes (i.e., routers and switches), as well as the bandwidth required on the links to report and exchange the collected network analytic data. This can be severe problem when the data flow being monitored has a high bandwidth, or when there is a large number of data flows to be monitored.

Sampling is a common technique used to obtain statistical attributes of the data packets without examining every packet. However, sampling cannot be applied in cases where end to end analysis of a data flow are desired without special assistance, since the different samples of data packets obtained at different nodes in the network may not overlap (i.e., they will not include information about the same data packets), this makes correlations between the data collected by each node for a given data flow very difficult.

The embodiments provide a solution in the form of a method and system to enable efficient data flow network analytics via sampling. A data flow may pass through many nodes in a given network domain. An ingress node through which a flow enters the network domain, can be configured to enable data flow sampling for various reasons, including for network analytics purposes. The ingress node can mark the received data packet of a given data flow in some fashion, to indicate that this data packet has been selected for special processing as it traverses the network domain. Upon detection of such data packet markings, the other nodes that the flow passes through may collect and report characteristics on the same set of packets. Data collected on the same packets can be correlated and further analyzed. These analyses can help to reveal deeper insight of the flow and the network. Before a marked data packet leaves the network, the marking in the data packet should be removed.

Packet Marking

There can be many different ways to mark the data packets for the purposes of the embodiments described herein. In some embodiments involving multi-protocol label switching (MPLS) data packets, for example, one or more new MPLS labels maybe inserted in the label stack for marking purposes. In embodiments involving an internet protocol (IP) packet, for example, a new IP options header maybe inserted for marking purposes. The embodiments described herein below focus on MPLS and IP by way of example and not limitation. One skilled in the art would understand that the processes and systems described herein are also applicable and adaptable to other network infrastructures and technologies. For other network technologies, appropriate marking technique may be devised following the same guidelines.

Example Network Domain

FIG. 1 is a diagram of one embodiment of a network domain traversed by a data flow. The illustrated simplified network topology is provided by way of example to demonstrate the marking and monitoring of data packets that traverse a network domain. The network includes a set of nodes that can be switches, routers or similar networking devices. The network domain is a set of networking devices that may have a common administrator and configuration. A network domain can include any number of networking devices organized with any number and configuration of links. The networking devices can be connected with wired or wireless links using any communication medium (e.g., fiber optic), networking protocols (e.g., MPLS or IP) and with any number of such links.

In the example illustrated network topology, an ingress node for a given data flow is in direct communication (i.e., is linked) with two external nodes and two internal nodes. The network topology includes two other nodes that may be considered border nodes one of which is an egress node for the data flow. A set of monitor nodes have been set up within the network domain to monitor the network analytics of data packets as they traverse the network domain. The monitor nodes have been selected in this example topology to be placed at locations where data flow traffic may take alternate routes. Strategic placement of the monitoring nodes can provide a high level of visibility to the movement of data packets across the network domain.

Marking

The embodiments provide a process whereby ingress nodes at the edge of the network domain can be configured to mark a select number of data packets that are received and to be forwarded across the network domain to egress nodes where the data packets will exit the network domain. These data packets can be sampled on a data flow by data flow basis with separate selection criteria utilized for each data flow. Any selection criteria or process can be used to identify the data packets to be tracked dependent on the network analytic data to be collected. The data packets of a particular data flow can be marked at set intervals or with specific sequencing. In other embodiments, the data packets can be selected based on header or payload characteristics. A network administrator can set any selection criteria.

An example process for marking the identified data packets is described herein below that is compatible with any frequency or criteria for data packet selection. Similarly, the precise mechanism for marking the data packets can vary depending on the technologies involved. A general process is provided herein below followed by specific examples for MPLS and IP technologies.

Figure 2:
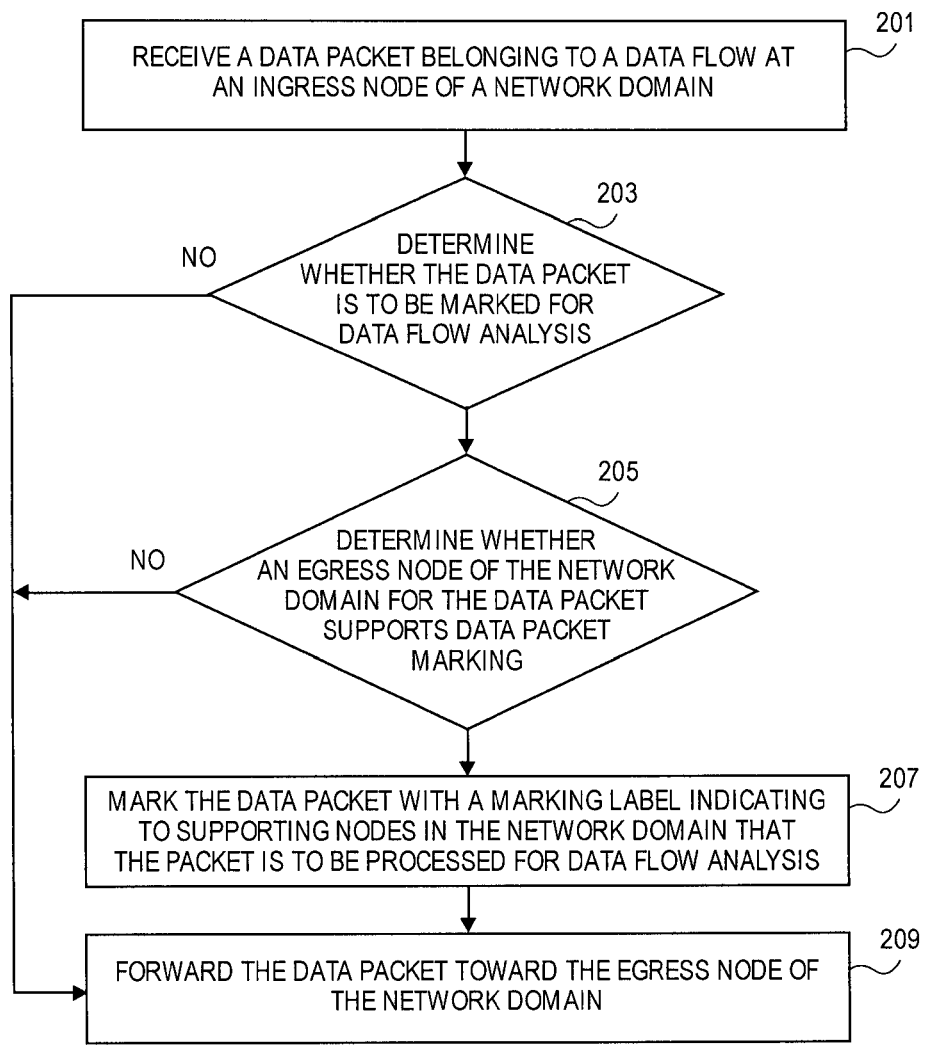
FIG. 2 is a flowchart of one embodiment of a process for marking data packets for network analytics.

FIG. 2 is a flowchart of one embodiment of a process for marking data packets for network analytics. The process is implemented by the ingress node of a data flow for a network domain. Each data flow can have a separate ingress and egress node for the network domain and a given network node can serve as an ingress node for some data flows while serving as an egress node for other data flows. For sake of clarity the example network of FIG. 1 may be referred to illustrating a single data flow traversing a network domain. One skilled in the art would understand that any number of data flows can traverse the network domain using any combination of edge nodes as ingress and egress nodes.

The process can therefore be initiated in response to receiving a data packet at the node (Block 201). A determination is then made whether the data packet is to be marked for data flow analysis (Block 203). The determination can be made based on any configured criteria as may befit the network analysis. The data packets can be selected without examination by selecting them in particular sequences, at particular intervals or based on similar selection schemes. Similarly, the contents of the header or the payload can be inspected to determine whether designated criteria are met. This inspection can add additional computational requirements to the data flow processing. If it is determined that the received data packet is not to be marked, then the process completes by forwarding the data packet toward the egress node of the network domain (Block 209). The forwarding can be carried out according to the forwarding information base or using a similar process.

If the data packet is determined to be marked, then the process makes a determination whether an egress node of the network domain for the data packet supports the data packet marking process (Block 205). The egress node can be determined by examination of the header information of the data packet and/or from information related to the data flow to which the data packet belongs. If the egress node does not support the marking process then the process proceeds to forward the data packet without marking it (Block 209). This can affect the selection of the next data packet for marking dependent on the algorithm utilized to identify data packets to be marked. For example, if a data packet is identified based on its sequence, then the next data packet can be selected to replace this data packet. A data packet destined for the egress node that does not support marking process causes this data packet to be skipped because if the data packet were marked then the data packet may exit the network domain with the marking label generated by the marking process, which could have a negative effect on its handling outside of the network domain where the marking label may be improperly processed, rather than being discarded.

Where the data packet has been selected for marking and the egress node of the data packet is also determined to support the marking process then the data packet can be marked with a marking label indicating to supporting nodes in the network domain that the data packet is to be processed for network analytics (Block 207). Any type and content of marking label can be utilized to mark the data packet for the network analytics collection. Example implementation are discussed herein below with regard to FIGS. 5A-D. Once the data packet has been marked with a marking label, then it can be forwarded toward the egress node (Block 209) using forwarding information determined from the data packet header by the forwarding information base or similar processing structure.

Marking MPLS Packets

In embodiments where the marking process is implemented in an MPLS network, the Ingress Label Edge Router (I-LER) determines whether a data packet coming into the MPLS network should be marked for network analytics. The selection should guarantee that the Egress Label Edge Router (E-LER) for the data flow of the selected data packet is capable of removing the data packet markings. The I-LER marks the data packets by inserting a special MPLS label into the label stack, in one embodiment, the special MPLS label is inserted after the transport and application labels. Such a marking label can be referred to as a Marking Label Indicator (MLI). In other embodiments, the I-LER may also optionally insert a Flow Marking Label (FLM) after the MLI.

The Marking Label Indicator can include well-known reserved label values. In one embodiment, two MLIs can be defined, MLI1 and MLI2 as explained further herein below. The E-LERs remove the marking label by removing the marking label from the label stack. The following sections contain some examples of the marking process for MPLS as well as example MLI and FLM formats. In these examples, the Transport Label can be a label distribution protocol (LDP) or resource reservation protocol—tunnel engineering (RSVP-TE) label, the Application Label can be a border gateway protocol (BGP) level 2 virtual private network (L2VPN) or level 3 virtual private network (L3VPN) label, and the MLIs and FLMs are inserted at or near the bottom of the stack.

Figure 3A:
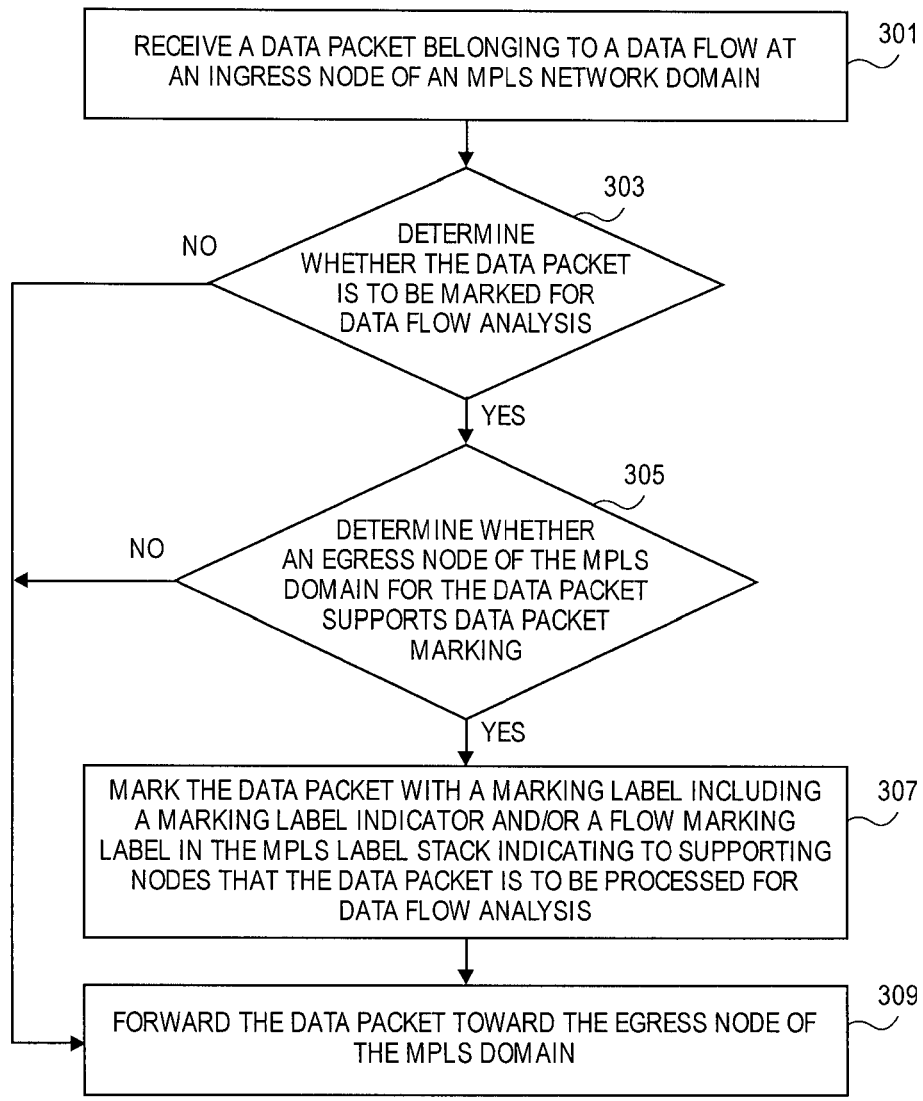
FIG. 3A is a flowchart of one embodiment of a process for marking data packets for network analytics in a Multiprotocol Label Switching Network.

FIG. 3A is a flowchart of one embodiment of a process for marking data packets for network analytics in a Multiprotocol Label Switching Network. The process is implemented by the ingress node (i.e., the I-LER) of a data flow for a network domain. As mentioned, a data flow can have a separate ingress and egress node (i.e., the E-LER) for the network domain and a given network node can serve as an ingress node for some data flows while serving as an egress node for other data flows.

The process can be initiated in response to receiving a data packet at the ingress node (I-LER) of the MPLS network domain (Block 301). A determination is then made whether the data packet is to be marked for data flow analysis (Block 303). The determination can be made based on any configured criteria as may befit the network analysis. The data packets can be selected without examination by selecting them in particular sequences, at particular intervals or based on similar selection schemes. Similarly, the contents of the encapsulating MPLS labels or the payload can be inspected to determine whether designated criteria are met. This inspection can add additional computational requirements to the data flow processing. If it is determined that the received data packet is not to be marked, then the process completes by forwarding the data packet toward the egress node (E-LER) of the network domain (Block 309). The forwarding can be carried out according to the forwarding information base or using a similar process.

If the data packet is determined to be marked, then the process makes a determination whether an egress node (E-LER) of the network domain for the data packet supports the data packet marking process (Block 305). The egress node can be determined by examination of the header information of the data packet and/or from information related to the data flow to which the data packet belongs. If the egress node does not support the marking process then the process proceeds to forward the data packet without marking it (Block 309). This can affect the selection of the next data packet for marking dependent on the algorithm utilized to identify data packets to be marked as mentioned above. A data packet destined for the egress node (E-LER) that does not support the marking process causes this data packet to be skipped because if the data packet were marked then the data packet may exit the network domain with the marking label generated by the marking process, which could have a negative effect on its handling outside of the network domain where the marking label may be improperly processed, rather than being discarded. In the case of MPLS, the E-LER would likely misinterpret and mishandle the marking label and this may cause the data packet to be discarded.

Where the data packet has been selected for marking and the egress node (E-LER) of the data packet is also determined to support the marking process then the data packet can be marked with a marking label indicating to supporting nodes in the network domain that the data packet is to be processed for network analytics (Block 307). Any type and content of marking label can be utilized to mark the data packet for the network analytics collection. Example implementations for MPLS are discussed herein below with regard to FIGS. 5A-C. For MPLS, a marking label can include a marking label indicator and/or a flow marking label. Once the data packet has been marked with a marking label, then it can be forwarded toward the egress node (E-LER) (Block 309) using forwarding information determined from the data packet header by the forwarding information base or similar processing structure.

Single Marking Label Indicator 1 (MLI1)

FIG. 5A is a diagram of one embodiment of a marking label for an MPLS implementation. The illustrated marking label is referred to herein as marking label indicator one (MLI1). The Mill utilizes a reserved label value. The use of the reserved label value allows the Label Transit Routers (LTRs) in the middle of the network domain to detect the marking label in the data packet. Once detected the LTRs can process the data packet and report on the data packet as well, contributing to and improving the overall data collection for network analytics.

In the embodiment where a single marking label indicator is utilized (e.g., MLI1), the presence of the MLI in a data packet only alerts the other nodes (LTRs) on the path that this data packet requires special processing. The details of what actions are to be taken for processing the data packet is configured on each node on the path that is set to monitor the data packets, the actions that are configured can include reporting, logging, time-stamping, fingerprinting, not action at all, and similar actions. It is up to the administrator or network analytic application to configure these actions on the monitoring nodes (LTRs), via a command line interface (CLI), network management system, software defined network (SDN) (e.g., an OpenFlow system) style control interface or similar system.

Flow Marking Label (FML)

In other embodiments, without using the reserved MLI, data packet sampling between ingress nodes (I-LERs) and egress nodes (E-LERs) for data flows is still possible, by using the Flow Marking Label (FML). In this embodiment, the FML can be downstream allocated from the egress node's (E-LER's) label space for point to point (P2P) or merging multi-point to point (MP2P) label switched paths (LSPs); or can be upstream allocated from the ingress node's (I-LER's) label space for point to multi-point (P2MP) LSPs. In this embodiment, the FML is a normal label (in contrast to the reserved label discussed above), and the label action corresponding to the FML would indicate to the egress node (E-LER) that this is a sampled data packet and special handling is required (for network analytics purposes for example).

In this embodiment, the monitoring nodes (LTRs) in the middle of the path (LSP) will not be able to detect the marking and collect information, because they will not be able to discern which packets contain an FML since it is buried within the label stack and the reserved label that is always inspected is not utilized to identify it as marked. An illustration of a MPLS packet with a Flow Marking Label is illustrated in FIG. 5B.

Marking Label Indicator 2+Flow Marking Label

In a further embodiment, a second type of marking label indicator (two) (MLI2) is utilized in conjunction with the flow marking label. The MLI2 makes use of another reserved label value (different from MLI1). The flow marking label can be assigned in several different schemes as described as follows.

In a first scheme, the flow marking label can be a real label, either downstream allocated in the P2P or merging (MP2P) LSP case, or upstream allocated in the P2MP LSP case. The label action corresponding to the FML would indicate that additional special handling is required (e.g., for network analytics purposes).

In a second scheme, the flow marking label can be assigned purely for flow identification purposes. In this case, the FML is not programmed in the label table on the egress node (E-LER). The FML will be included in the logging messages or reporting messages for identification purposes to network analytics applications. In this embodiment, the ingress node (I-LER) will push the MLI2 2 onto the received data packet followed by Flow Marking Label on to the label stack. The FML can be used to uniquely identify the flow using any format or scheme of unique identifiers. The FML is allocated for identification purposes, and can be included in the logging message or reporting messages (i.e., that are sent towards the network analytic applications and servers). In some embodiment, the FML should be sufficient to be used for load balancing purposes, i.e. to serve as an entropy label as defined in RFC6790. FIG. 5C is a diagram of one embodiment of the MLI2 and FML label scheme.

Internet Protocol

In another embodiment, the process and system can be implemented as part of an IP network such as an IPv4 or an IPv6 network domain. In an IPv4 network domain, a new IPv4 Option with fixed length (one octet) may be inserted into an IPv4 packet header of a data packet by the ingress router to mark the data packet for network analytics. This option is called IP Marking Option (MO). Ideally, the new marking option should be removed from the data packet before the marked data packet exits the network.

Similarly in an IPv6 network, a new fixed length (8 octets total) IPv6 extension header can be used to mark IPv6 packets. The format of the new extension header must follow the guidelines as specified in RFC2460. The top two bits of the new option type must be 00, which indicates that this option should be skipped over and to continue processing the header normally, if a node (e.g., a router) in the IP network domain does not support this new marking option. The lower 20 bits of this option can be a Flow Marking Label field that will carry the FML as defined herein above with regard to MPLS data packets and encapsulation. FIG. 5D is an illustration of the IPv6 format for marking the data packet of network analytics.

Figure 3B:
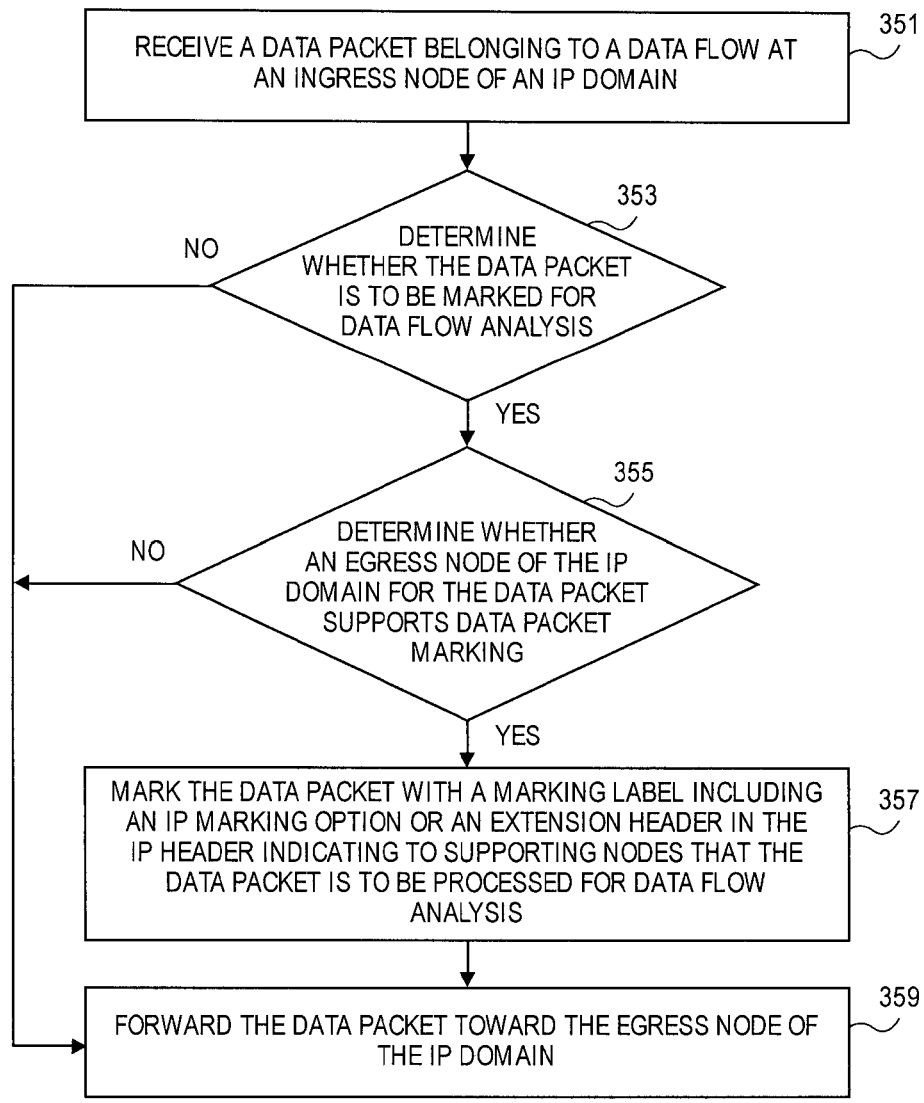
FIG. 3B is a flowchart of one embodiment of a process for marking data packet for network analytics in an Internet Protocol network.

FIG. 3B is a flowchart of one embodiment of a process for marking data packet for network analytics in an Internet Protocol network. The process is implemented by the ingress node (i.e., an ingress router) of a data flow for a network domain. As mentioned, a data flow can have a separate ingress and egress node (i.e., the egress router) for the network domain and a given network node can serve as an ingress node for some data flows while serving as an egress node for other data flows.

The process can be initiated in response to receiving a data packet at the ingress node (ingress router) of the IP network domain (Block 351). A determination is then made whether the data packet is to be marked for data flow analysis (Block 353). The determination can be made based on any configured criteria as may befit the network analysis. The data packets can be selected without examination by selecting them in particular sequences, at particular intervals or based on similar selection schemes. Similarly, the contents of the IP data packet header or the IP data packet payload can be inspected to determine whether designated criteria are met. This inspection can add additional computational requirements to the data flow processing. If it is determined that the received data packet is not to be marked, then the process completes by forwarding the data packet toward the egress node (i.e. egress router) of the IP network domain (Block 359). The forwarding can be carried out according to the forwarding information base or using a similar process.

If the data packet is determined to be marked, then the process makes a determination whether an egress node (egress router) of the IP network domain for the data packet supports the data packet marking process (Block 355). The egress node can be determined by examination of the header information of the IP data packet and/or from information related to the data flow to which the data packet belongs. If the egress node does not support the marking process then the process proceeds to forward the data packet without marking it (Block 309). This can affect the selection of the next data packet for marking dependent on the algorithm utilized to identify data packets to be marked as mentioned above. A data packet destined for the egress node (egress router) that does not support the marking process causes this data packet to be skipped because if the data packet were marked then the data packet may exit the network domain with the marking label generated by the marking process, which could have a negative effect on its handling outside of the network domain where the marking label may be improperly processed, rather than being discarded. In the case of IP, the internal routers and the egress router would ignore the contents of the optional header information in either misinterpret and mishandle the marking label and this may cause the data packet to be discarded.

Where the data packet has been selected for marking and the egress node (egress router) of the data packet is also determined to support the marking process then the data packet can be marked with a marking label indicating to supporting nodes in the network domain that the data packet is to be processed for network analytics (Block 357). Any type and content of marking label can be utilized to mark the data packet for the network analytics collection. Example implementation are discussed herein above that are appropriate for IP network domains with regard to FIG. 5D. For IP, a marking label can include a flow marking label or similar information in the IPv4 or IPv6 header. Once the data packet has been marked with a marking label, then it can be forwarded toward the egress node (egress router) (Block 359) using forwarding information determined from the data packet header by the forwarding information base or similar processing structure.

Marking Removal

Regardless of the type of network, for example MPLS or IP network domains, the egress nodes will examine the data packets to identify marked data packets and will remove the marking label before the data packets are forwarded out of the network domain. As each data packet is received at the egress node, the data packets are each checked to identify those that are marked and then the marking labels are removed.

Figure 4:
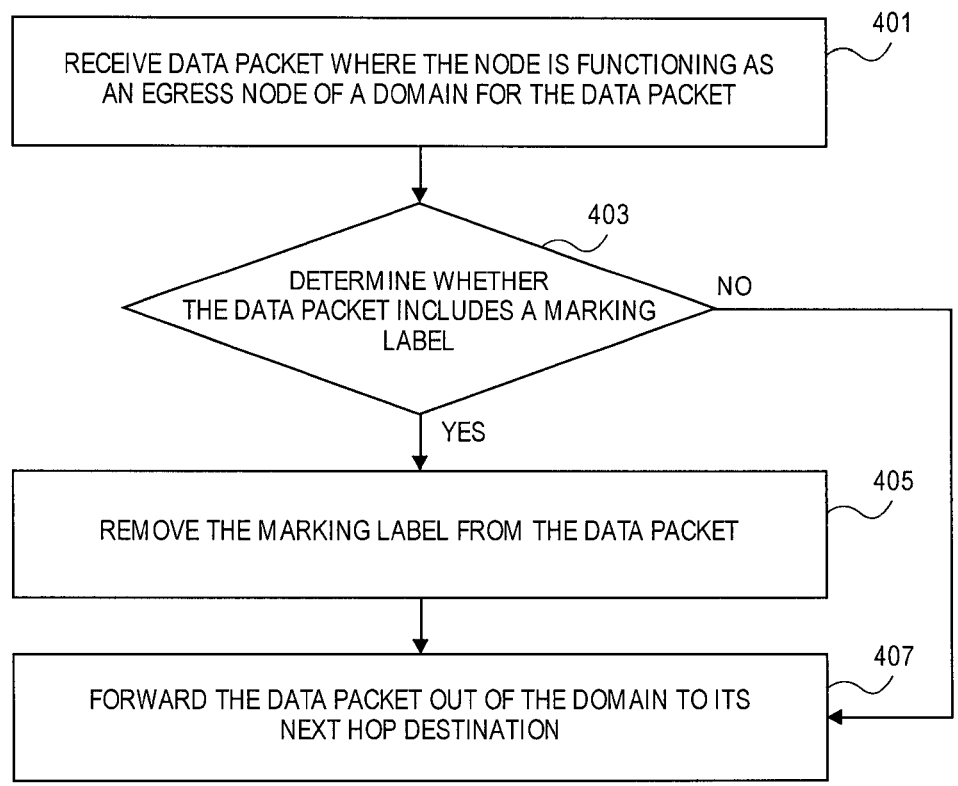
FIG. 4 is a diagram of one embodiment of a process for an egress node in the network domain.

A FIG. 4 is a diagram of one embodiment of a process for an egress node in the network domain. The process is initiated at the egress node in response to receiving a data packet from an interface facing the network domain and having a next hop outside the network domain (Block 401). The node functions as an egress node for a give data flow. For other data flows the same node may be an ingress node or a node along the path of the data flow. A check is made whether the received data packet includes a marking label when these conditions are met (Block 403). If there is no marking label then the data packet can be forwarded to the next hop outside the network domain. The location and contents of the marking label will vary depending on the type of network and marking label scheme utilized as set forth in the embodiments and examples above.

However, if the data packet does include a marking label then the egress router removes the marking label form the data packet (Block 405). Removal of the marking label can be the removal of a layer of encapsulation, the deletion of header data or similar removal technique that removes the marking label and returns the data packet to an unmarked state such that subsequent processing of the data packet will not be affected by the data packet having been previously marked. The data packet can then be forwarded onto the next hop according to the forwarding information base or using a similar process (Block 407).

Signaling of Marking Label Support

An egress node (e.g., an E-LER or egress router) can signal to other nodes in the network domain (e.g., ingress nodes in the form of I-LERs or ingress routers) of its ability to process and remove marking labels including MLIs and FMLs. This capability is called Marking Label Capability (MLC). The signaling of MLC can occur in different ways, depending on the type of network and protocol utilized by the network (e.g., a MPLS signaling protocol used in an MPLS network domain). In one embodiment, label distribution protocol (LDP) can be utilized for signaling. A new MLC type-length-value (TLV) can be added as an Optional Parameter of the Label Mapping Message TLV, to signal that the egress node (i.e. an E-LER) at the tail end of the LDP tunnel can process and remove MLIs and FMLs. In another embodiment, RSVP-TE can be used for the signaling. A new MLC capability TLV can be added to the LSP Attribute TLV to signal that the egress node (i.e. an E-LER) at the tail end of the RSVP-TE tunnel can process and remove MLIs and FLMs. In a further embodiment, the signaling protocol can be a border gateway protocol (BGP). A new optional transitive MLC attribute can be added to the BGP UPDATE messages as part of the PATH attributes, to signal that the advertising BGP router can process and remove MLIs and FLMs.

Packet Processing Example

In one example application of the processes described herein above, an MPLS network domain that provides BGP MPLS L3VPN service. A network analytics server is monitoring this network. All LERs are configured to sample and report 1% of the packets for network analytics purposes. Some key LTRs in the middle of the network are also configured to report on packets with MLIs. In reference to example FIG. 1, the LTRs are labeled as monitor nodes, whereas the I-LER is the ingress node, and E-LER is the egress node. An LSP traverses the network between these two nodes and carries the data flow to be monitored in this example.

Each I-LER is configured to sample 1% of incoming VPN packets to report to a network analytics server. Here the reports can be more detailed, which may contain the truncated packet and other metadata such as timestamps, arriving interface, and similar information. For each of the packets identified for analytics purposes, the I-LERs would insert the Marking Label Indicator 2 (MLI2) and a Flow Marking Label into the MPLS Label stack, before sending the packet towards the E-LERs.

Some of the LTRs at strategic locations inside the network can also be configured to detect MLIs. They will also send reports of the marked packets to the analytics servers. Here the reports may contain only minimal info such as timestamp and FML. All E-LERs are also instructed to detect all packets with MLIs. Reports on these marked packets are sent to the network analytics server. Here the reports may be detailed, similar to the reports generated by the I-LERs. The network analytics server can reside at any location in communication with the nodes of the network domain. The MLIs and FLMs are all removed by the E-LERs before packets exit the MPLS network.

Process Features

The processes and system can be employed to improve data collection efficiency, for ease of implementation and to obtain data that tracks and characterizes real data flows. The embodiments provide a data packet marking solution that enables the nodes (routers and switches) to sample incoming traffic for network analytic purposes. This allows the nodes of the network domain to process and report a much smaller number of packets on a per flow basis. The embodiments enable switches and routers with lower processing power to be able to monitor higher bandwidth flows, as well as a larger number of flows. Further, these embodiments are simple and easy to implement at the router and switch level either via CLI, via SDN based implements or similar configuration options. The embodiments can also work with many different types of marking techniques. The marking methods are not limited to the ones discussed herein above, which have been provided by way of example. Thus, the embodiment can monitor and measure real traffic and flows, they do not require the use of generated operations, administration and management (OAM) traffic.

Architecture

Figure 6:
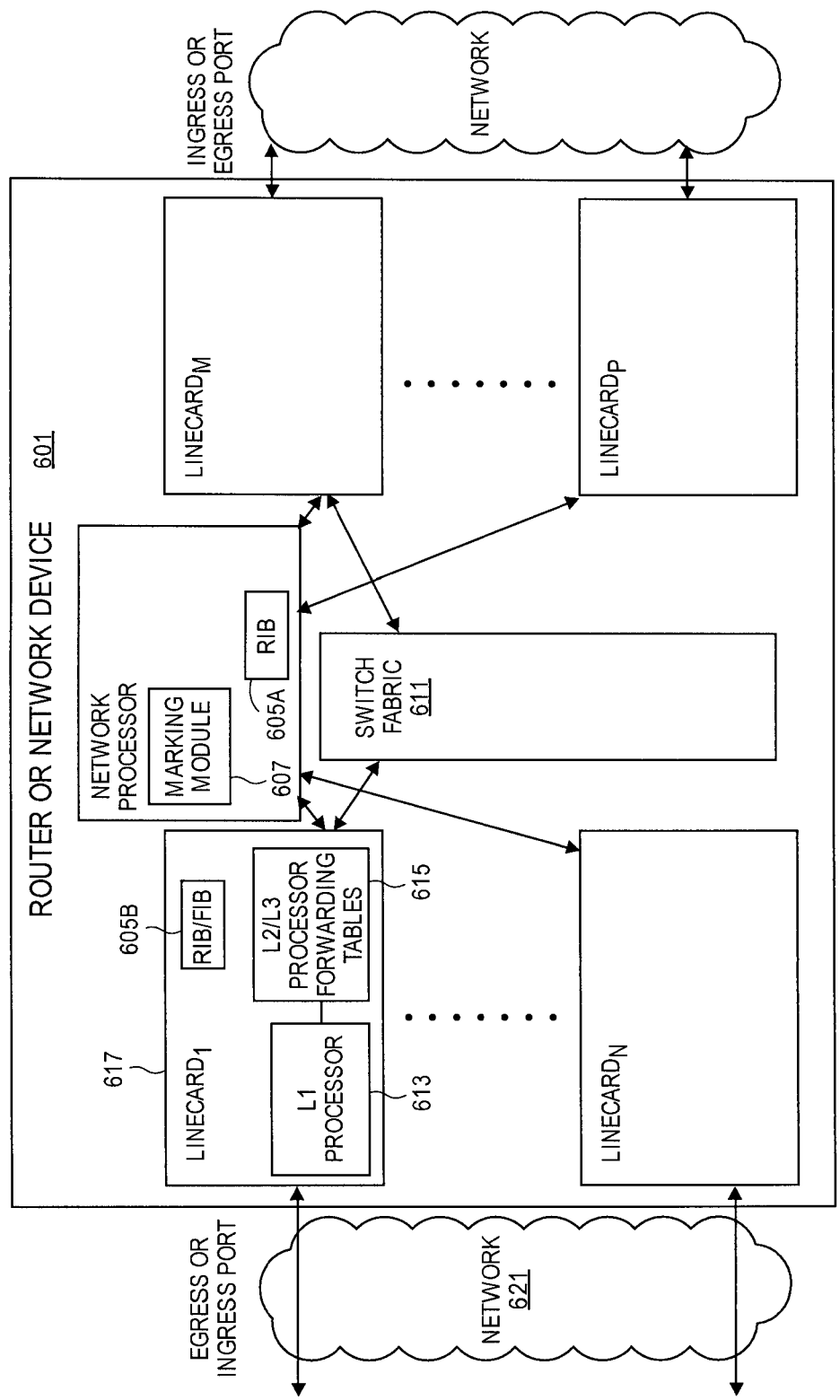
FIG. 6 is a diagram of one embodiment of a network device (ND) implementing a process for marking and network analytics.

FIG. 6 is a diagram of one embodiment of a network device implementing the marking process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the marking process is implemented by a network device 601 or similar computing device. The network device 601 can have any structure that enables it to receive data traffic and forward it toward its destination. The network device 601 can include a network processor 603 or set of network processors that execute the functions of the network device 601. A 'set,' as used herein, is any positive whole number of items including one item. The network device 601 can execute an a marking module 607 to implement the functions of marking including marking data packets when functioning as an ingress node or removing marking when functioning as an egress node where the network device 601 functions as switch or router in the network domain as described herein above via a network processor 603.

The network device 601 connects with separately administered networks that have user equipment and/or content servers. The network processor 603 can implement the marking module 607 as a discrete hardware, software module or any combination thereof. The network processor 603 can also service the routing information base 605A and similar functions related to data traffic forwarding and network topology maintenance. The routing information base 605A can be implemented as match action tables that are utilized for forwarding protocol data units PDUs (i.e. packets). The functions of the marking module 607 can be implemented as modules in any combination of software, including firmware, and hardware within the network device. The functions of the marking module 607 that are executed and implemented by the network device 601 include those described further herein above.

In one embodiment, the network device 601 can include a set of line cards 617 that process and forward the incoming data traffic toward the respective destination nodes by identifying the destination and forwarding the data traffic to the appropriate line card 617 having an egress port that leads to or toward the destination via a next hop. These line cards 617 can also implement the forwarding information base 605B, or a relevant subset thereof. The line cards 617 can also implement or facilitate the marking module 607 functions described herein above. The line cards 617 are in communication with one another via a switch fabric 611 and communicate with other nodes over attached networks 621 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 601 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figures 7A, 7B:
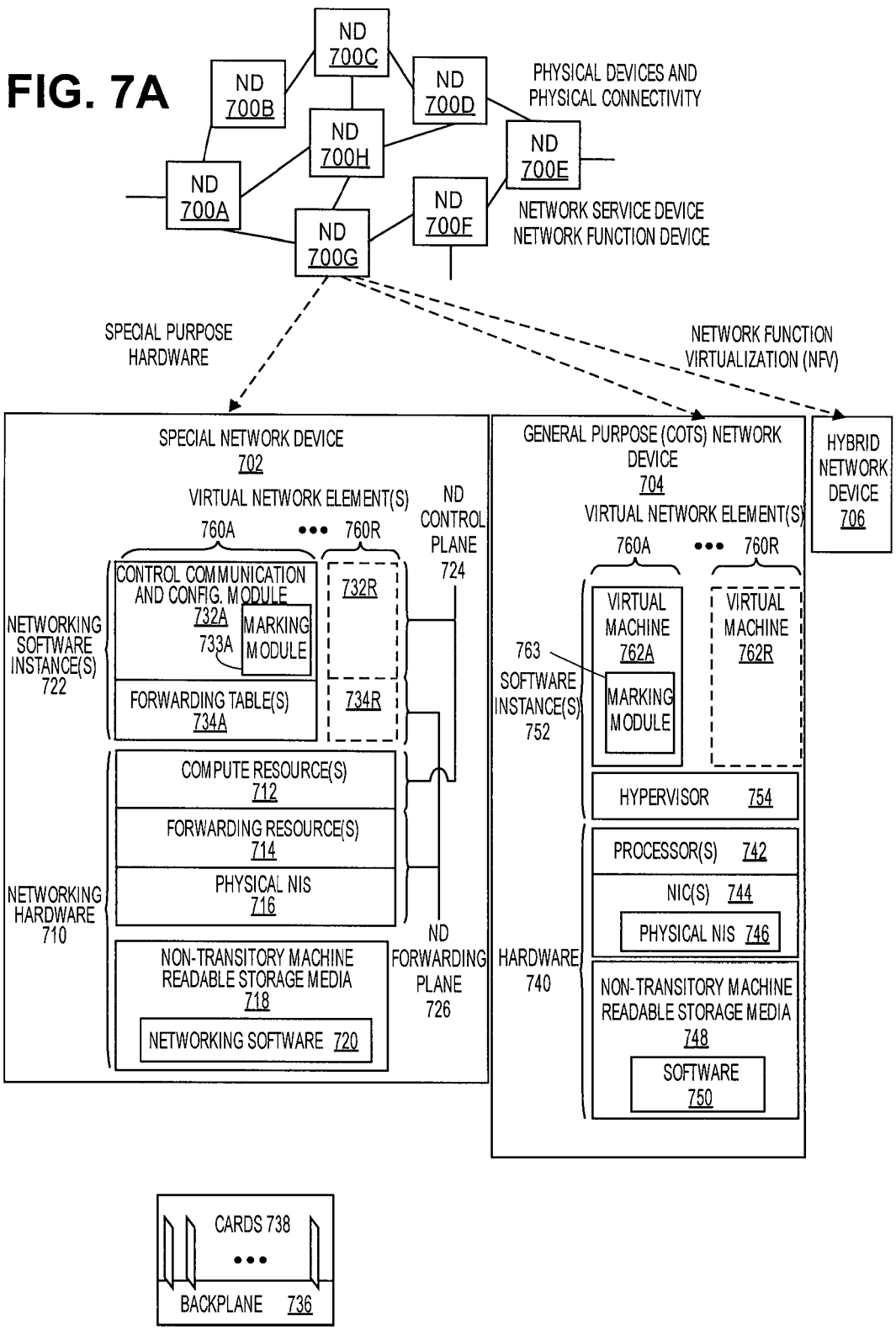
FIG. 7A illustrates connectivity between network devices (NDs) within an exemplary network, as well as three exemplary implementations of the NDs, according to some embodiments of the invention.
FIG. 7B illustrates an exemplary way to implement the special-purpose network device according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated circuits (ASICs) and a proprietary operating system (OS); and 2) a general-purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). In some embodiments, the control communication and configuration module 732A encompasses the marking module 733A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) (i.e. implemented as match action tables) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) are to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R. In some embodiments, the virtual machine module 762A encompasses marking module 764A.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R that are implementations of match action tables (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach). In some embodiments, the centralized reachability and forwarding module 779 encompasses marking functions in marking module 781 as described herein above.

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 676 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 786 thus enables the execution of applications that manage or interact with the functions associated with the network elements.

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 676 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 8:
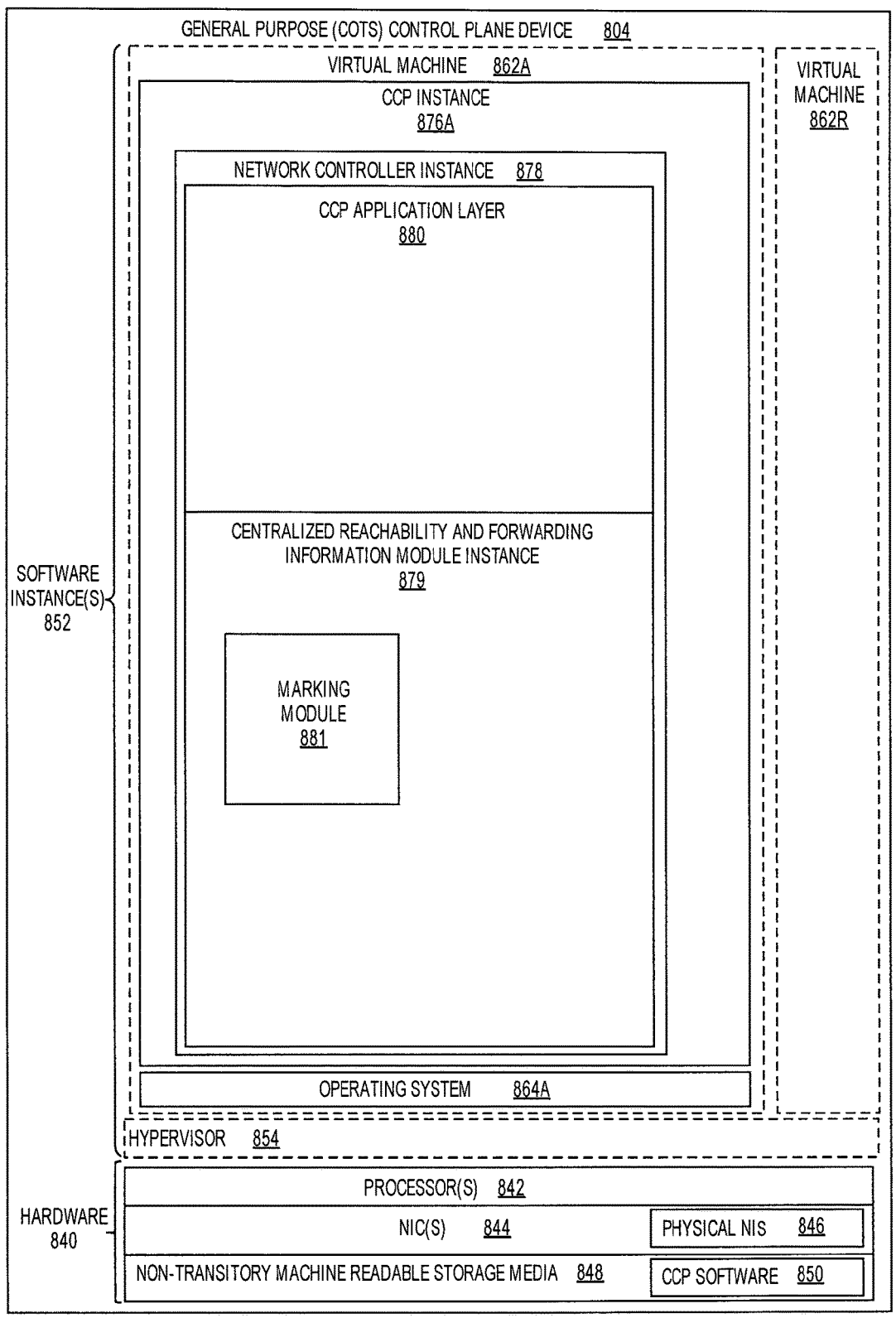
FIG. 8 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 878 to the operating system 864A and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 876 works with virtual network view(s) (logical view(s) of the network) and the middleware layer provides the conversion from the virtual networks to the physical view. The CCP application can encompass the functionality of the marking module 881 as described herein above. Similarly, the CCP application layer 880 can implement the marking module 887 in addition to the other applications 888.

The centralized control plane 876 transmits relevant messages to the data plane 880 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method implemented by a node of a network domain having a plurality of nodes, where the node functions as an ingress node of the network domain for a data flow, the method to enable data flow analysis across the network domain, the method comprising the steps of:

receiving a data packet belonging to a data flow at an ingress node of the network domain;

determining whether the data packet is to be marked for the data flow analysis;

determining whether an egress node of the network domain for the data flow supports data packet marking for data flow analysis separate from forwarding information, based on an egress node initiated signaling of packet marking support;

marking the data packet with a marking label in response to the egress node supporting data packet marking, the marking label indicating to supporting nodes in the network domain including at least one interior node in the network domain that the data packet is to be processed for data flow analysis including collecting and reporting characteristics of the data packet by each of the supporting nodes; and forwarding the data packet toward the egress node of the network domain.

2. The method of claim 1, wherein the network domain is a multiprotocol label switching domain or an internet protocol domain.

3. The method of claim 1, wherein marking the data packet further comprises:

marking the data packet with a marking label including at least one of a marking label indicator or a flow marking label in the MPLS label stack.

4. The method of claim 1, wherein marking the data packet further comprises:

marking the data packet with a marking label including at least one of an internet protocol marking option or an extension header in the internet protocol header of the data packet.

5. The method of claim 1, further comprising the steps of:

receiving a second data packet where the node is functioning as an egress node of a network domain for the second data packet;

determining whether the data packet includes a marking label;

removing the marking label from the second data packet; and forwarding the data packet out of the domain to a next hop destination of the second data packet.

6. A network device functioning as a node of a network domain having a plurality of nodes, where the node functions as an ingress node of the network domain for a data flow, the method to enable data flow analysis across the network domain, the network device comprising:

a non-transitory computer-readable medium having stored therein a marking module; and a processor coupled to the non-transitory computer-readable medium, the processor configured to execute the marking module, the marking module configured to receive a data packet belonging to a data flow at an ingress node of the network domain, to determine whether the data packet is to be marked for the data flow analysis, to determine whether an egress node of the network domain for the data flow supports data packet marking for data flow analysis separate from forwarding information, based on an egress node initiated signaling of packet marking support received from the egress node, to mark the data packet with a marking label in response to the egress node supporting data packet marking, the marking label indicating to supporting nodes in the network domain including at least one interior node in the network domain that the data packet is to be processed for data flow analysis including collecting and reporting characteristics of the data packet by each of the supporting nodes, and to forward the data packet toward the egress node of the network domain.

7. The network device of claim 6, wherein the network domain is a multiprotocol label switching domain or an internet protocol domain.

8. The network device of claim 6, wherein the marking module is further configured to mark the data packet by marking the data packet with a marking label including at least one of a marking label indicator or a flow marking label in the MPLS label stack.

9. The network device of claim 6, herein the marking module is further configured to mark the data packet by marking the data packet with a marking label including at least one of an internet protocol marking option or an extension header in the internet protocol header of the data packet.

10. The network device of claim 6, wherein the marking module is further configured to receive a second data packet where the node is functioning as an egress node of a network domain for the second data packet, to determine whether the data packet includes a marking label, to remove the marking label from the second data packets and to forward the data packet out of the domain to a next hop destination of the second data packet.

11. A computing device functioning as a node of a network domain, the network domain including a plurality of nodes, where the node functions as an ingress node of the network domain for a data flow, the computing device to execute a plurality of virtual machines for implementing network function virtualization (NFV), wherein a virtual machine from the plurality of virtual machines is configured to implement a method to enable data flow analysis across the network domain, the computing device comprising:

a non-transitory computer-readable medium having stored therein a marking module; and a processor coupled to the non-transitory computer-readable medium, the processor configured to execute the virtual machine, the virtual machine configured to execute the marking module, the marking module configured to receive a data packet belonging to a data flow at an ingress node of the network domain, to determine whether the data packet is to be marked for the data flow analysis, to determine whether an egress node of the network domain for the data flow supports data packet marking for data flow analysis separate from forwarding information, based on an egress node initiated signaling of packet marking support received from the egress node, to mark the data packet with a marking label in response to the egress node supporting data packet marking, the marking label indicating to supporting nodes in the network domain including at least one interior node in the network domain that the data packet is to be processed for data flow analysis including collecting and reporting characteristics of the data packet by each of the supporting nodes, and to forward the data packet toward the egress node of the network domain.

12. The computing device of claim 11, wherein the network domain is a multiprotocol label switching domain or an internet protocol domain.

13. The computing device of claim 11, wherein the marking module is further configured to mark the data packet by marking the data packet with a marking label including at least one of a marking label indicator or a flow marking label in the MPLS label stack.

14. The computing device of claim 11, wherein the marking module is further configured to mark the data packet by marking the data packet with a marking label including at least one of an internet protocol marking option or an extension header in the internet protocol header of the data packet.

15. The computing device of claim 11, wherein the marking module is further configured to receive a second data packet where the node is functioning as an egress node of a network domain for the second data packet, to determine whether the data packet includes a marking label, to remove the marking label from the second data packets and to forward the data packet out of the domain to a next hop destination of the second data packet.

16. A control plane device to implement a control plane of a software defined networking (SDN) network including a plurality of network devices implementing the data plane of the SDN network, wherein control plane device is configured to execute a method to enable data flow analysis across the network domain, the control plane device comprising:
a non-transitory computer-readable medium having stored therein a marking module; and
a processor coupled to the non-transitory computer-readable medium, the processor configured to execute the marking module, the marking module configured to receive a data packet belonging to a data flow at an ingress node of the network domain, to determine whether the data packet is to be marked for the data flow analysis, to determine whether an egress node of the network domain for the data flow supports data packet marking for data flow analysis separate from forwarding information, based on an ingress node initiated signaling of packet marking support received from the egress node, to mark the data packet with a marking label in response to the egress node supporting data packet marking, the marking label indicating to supporting nodes in the network domain including at least one interior node in the network domain that the data packet is to be processed for data flow analysis including collecting and reporting characteristics of the data packet by each of the supporting nodes, and to forward the data packet toward the egress node of the network domain.

17. The control plane device of claim 16, wherein the network domain is a multiprotocol label switching domain or an internet protocol domain.

18. The control plane device of claim 16, wherein the marking module is further configured to mark the data packet by marking the data packet with a marking label including at least one of a marking label indicator or a flow marking label in the MPLS label stack.

19. The control plane device of claim 16, wherein the marking module is further configured to mark the data packet by marking the data packet with a marking label including at least one of an internet protocol marking option or an extension header in the internet protocol header of the data packet.

20. The control plane device of claim 16, wherein the marking module is further configured to receive a second data packet where the node is functioning as an egress node of a network domain for the second data packet, to determine whether the data packet includes a marking label, to remove the marking label from the second data packets and to forward the data packet out of the domain to a next hop destination of the second data packet.

* * * * *